July 15, 1952  H. SOHON ET AL  2,603,103
VARIABLE INERTIA DEVICE
Filed Sept. 20, 1949
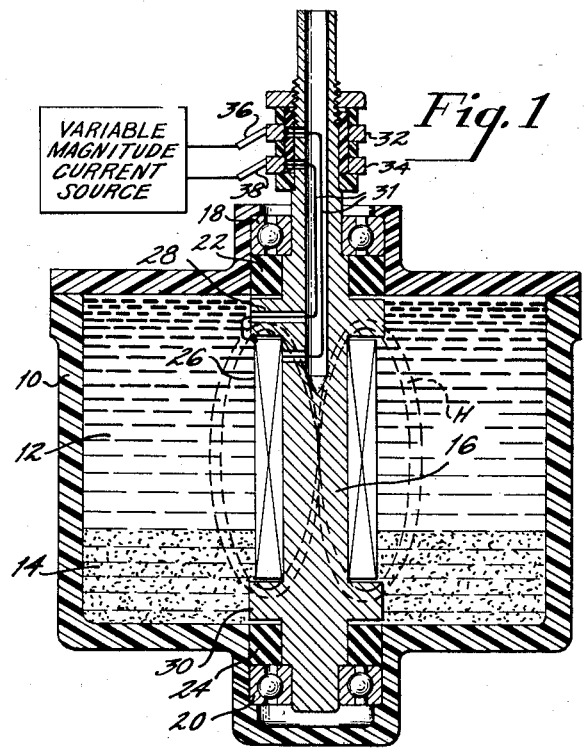
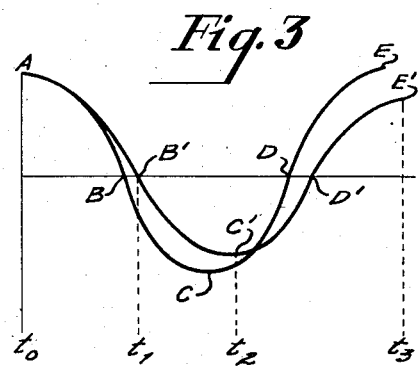
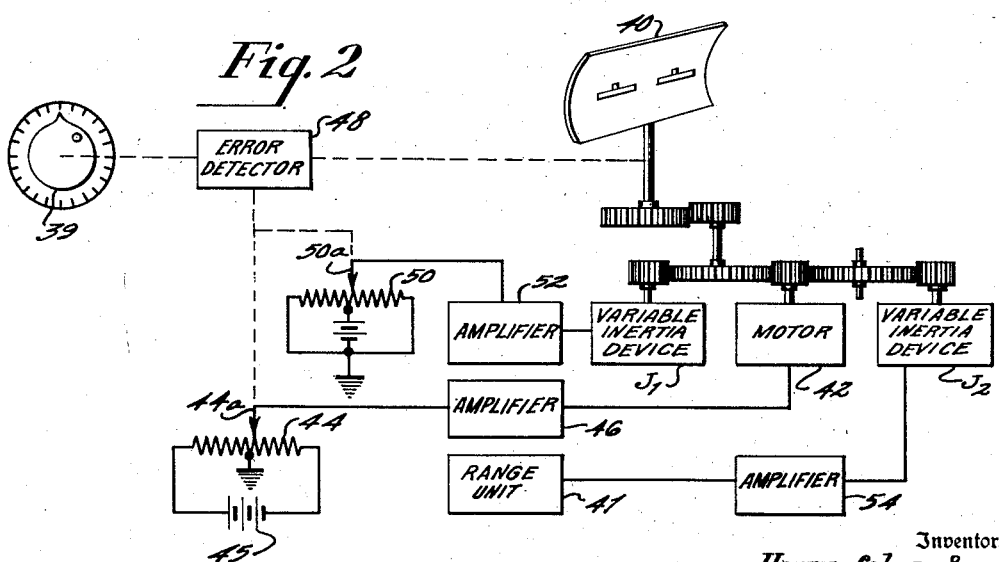
Inventors
*Harry Sohon &
Leonard Jacobs*
By *Morris A. Rabkin*
Attorney Patented July 15, 1952

2,603,103

UNITED STATES PATENT OFFICE 2,603,103

VARIABLE INERTIA DEVICE

Harry Sohon, Havertown, and Leonard Jacobs, Philadelphia, Pa., assignors to Radio Corporation of America, a corporation of Delaware Application September 20, 1949, Serial No. 116,838

6 Claims. (Cl. 74—572)

This invention relates to variable inertia devices, and particularly to a substantially frictionless variable inertia device wherein the inertia can be changed in extremely small increments.

In some types of mechanical systems, it is advantageous to have a movable member with variable inertia, either to provide oscillation damping or to vary the relationship between the inertias of a driving and a driven element.

Heretofore, variable inertia devices have been proposed wherein rotatable elements having different inertias can be connected into a mechanical system through a friction clutch. Such devices are objectionable both because the inertia can be varied only in discrete steps, and because the friction clutches are subject to wear and, consequently, require replacement from time to time.

It is, accordingly, a general object of the present invention to provide a substantially frictionless variable inertia device, and one in which the inertia can be varied in extremely small increments.

Another object of the invention is to provide a variable inertia device wherein no frictional clutching is required between the variable inertia device and the mechanical elements associated therewith.

A further object of the invention is to provide an apparatus for varying the amount of inertia in a mechanical movement system in a substantially continuous manner.

In accordance with the invention, the foregoing and other related objects and advantages are attained by mounting a magnetizable rotatable element in a container having finely divided magnetic particles therein, and magnetizing the rotatable element to attract a desired number of the magnetic particles thereto. Preferably, a suitable liquid also is placed in the container to reduce friction between the particles. With this arrangement, the intensity of the magnetization of the rotatable element can be varied in order to vary the number of magnetic particles attracted thereto, so that the inertia of the device can be varied continuously in any desired manner.

A more complete understanding of the invention can be had from the following description of an illustrative embodiment thereof, when considered in connection with the accompanying drawings, wherein:

Figure 1 is a cross-section view of a variable inertia device arranged in accordance with the invention, Figure 2 is a schematic diagram of a mechanical movement system including a variable inertia device of the type shown in Figure 1, and Figure 3 is a graph illustrating the principle of operation of the variable inertia device of Figure 1 when coupled in a system of the type shown in Figure 2.

Referring to Figure 1 of the drawing, a variable inertia device embodying the principles of the present invention comprises a housing 10 containing a liquid bath 12 of oil or the like. A relatively large number of finely divided particles 14 of magnetic material, such as iron or the like, are immersed in the liquid 12 in the housing 10, it being understood that the particles 14 are free to move in the liquid as long as they are not magnetized. The liquid 12 serves to prevent packing of the particles 14, as well as to reduce friction between the particles, and is deemed preferable although not essential to the operation of the device.

A magnetizable shaft 16 is rotatably mounted in the housing 10 in bearings 18, 20 and has one end extending outside the housing in order that the shaft can be coupled to a rotary drive mechanism (not shown). Sealing bushings 22, 24 are disposed in the housing wall around the shaft 16 in order to prevent the magnetic particles 14 from working into the bearings 18, 20.

A coil of wire 26 is wound on the shaft 16 between annular retaining shoulders 28, 30, and connections 31 are brought out from the coil 26, preferably through the center of the shaft 16, to slip-rings 32, 34 through which energizing current can be furnished to the coil 26 in order to magnetize the shaft 16.

A pair of brushes 36, 38 engage the slip-rings 32, 34, respectively, and are connected to a source of variable magnitude energizing current, which may be either alternating or unidirectional.

In operation, when energizing current is supplied through the slip-rings 32, 34 to the coil 26, a magnetic field H will be established which will extend axially through the shaft 16, into the liquid bath 12, and back to the shaft (as shown by the dotted lines), so that the magnetic particles 14 in the liquid will become magnetized and will be attracted to the shaft 16 in greater or less amount depending on the intensity of the magnetic field established by the energizing current. In order to avoid any frictional "clutching" action between the shaft 16 and the housing 10, the magnetic field H preferably should be confined substantially to the shaft 16 and the liquid 12, as by making the housing 10 of non-magnetic material, by making the housing of such dimensions that the field H will be very weak in the vicinity of the housing walls, or by any similar expedient which will accomplish the same result. If the path of the magnetic field were to include the housing, the effect would be to form a coupling between the shaft and the housing which would prevent the shaft from rotating relative to the housing, and would involve frictional losses as well as producing an undesirable "clamping" action on the shaft, thereby interfering with the proper operation of the device.

In Figure 2, I have illustrated a typical mechanical system wherein two variable inertia devices of the type shown in Figure 1 can be used to advantage. The system shown in Figure 2 is a so-called "servo" system for controlling the rotational position of a directional antenna 40, such as in an object-locating apparatus, by means of a hand-wheel 39. In such an apparatus, high frequency signals from the antenna 40 are reflected by distant objects and received at the antenna 40, with the transit time of the signals between the antenna and the distant object being measured and converted into a range voltage in a range unit 41 to represent the distance of the object from the apparatus, and with the relative rotational position of the antenna being taken as the bearing of the object relative to the apparatus.

The antenna 40 is driven through a gear train by a motor 42, the operation of which is controlled by voltages obtained from an "error voltage" source represented as a potentiometer 44 in parallel with a battery 45. The position of the potentiometer arm 44a is determined by an error detector 48, which may comprise synchro devices (see e. g. "Principles of Radar"—M. I. T. Radar School Staff 2nd edition; pgs. 12-3 through 12-26) mechanically coupled to the hand-wheel 39 and to the antenna 40 so as to detect differences in the relative rotational positions of the hand-wheel 39 and of the antenna 40. Any angular difference between the relative rotational positions of the hand-wheel 39 and antenna 40 will cause movement of the potentiometer arm 44a and will be represented by an "error voltage" of suitable polarity which will be obtained from the arm 44a and amplified in a power amplifier 46. This error will energize the motor 42 which, in turn, will cause the antenna 40 to move in the proper direction to eliminate the angular difference between antenna position and hand-wheel position.

In a servo system of the type thus far described, a so-called "anti-hunt" device must be provided to prevent oscillation of the antenna about the rest position. Such oscillations may be minimized by a "tachometer feedback system," wherein a voltage is derived which is proportional to the acceleration of the drive motor and which is applied to the drive motor amplifier to reduce the gain thereof when the motor is speeding up or slowing down. However, such devices are relatively complex and expensive. An alternative method of damping is to use a viscous device to retard the motion of the driven element, but such devices are less efficient since they introduce a steady state error which lasts as long as the driven element is in motion. In comparison therewith, a variable inertia device of the type described herein can be utilized as a simple and relatively inexpensive anti-hunt device which will not cause appreciable steady state error.

In the system shown in Fig. 2, a variable inertia device $J_1$ of the type shown in detail in Fig. 1 is mechanically coupled to the drive motor 42 through a gear train, and is connected to receive magnetizing current from a potentiometer 50 through an amplifier 52, with the potentiometer arm 50a being coupled to the error detector 48 and the arrangement being such that a large magnetizing current will flow in the control winding of the inertia device $J_1$ when the angular difference between the hand-wheel and the antenna is small, and will decrease as the angular difference increases, thereby providing high inertia when the angular error in antenna position is zero.

In Fig. 3, wherein the oscillatory damping action of the variable inertia device in the system of Fig. 2 is depicted graphically in comparison with an undamped oscillatory motion, displacement of the antenna (relative to the hand-wheel) is plotted as the ordinate against time as the abscissa. Assuming an initial displacement of instantaneous magnitude A at time $t_0$, in a perfectly undamped system the subsequent displacements would follow a cosine curve A, B, C, D, E, hereinafter designated as curve A-E. With a variable inertia anti-hunt device in the system, the inertia will increase as the displacement amplitude decreases, thereby decreasing the frequency of the oscillations. This is illustrated by the curve A, B', C', D', E', hereinafter designated A-E'. The first point of zero displacement in the curve A-E' will occur at some time $t_1$ subsequent to the time of zero displacement in the undamped curve A-E. At time $t_1$, the velocity of the oscillatory motion will be substantially decreased due to the inertia increase which will accompany the error voltage decrease. As the displacement of the system increases in the opposite direction (during the time interval $t_1$—$t_2$), the inertia will decrease until the time $t_2$. Although the motion of the shaft in the variable inertia device will be reduced to zero at the time $t_2$, the magnetic particles released during the time interval $t_1$—$t_2$ will continue to move due to kinetic energy proportional in amount to the difference in the amplitude of the two curves A-E and A-E' at the time $t_2$. As the shaft of the variable inertia rotates in the opposite direction during the time interval $t_2$—$t_3$, the magnetic particles released during the preceding time interval $t_1$—$t_2$ will be picked up, but since these particles will be revolving about the shaft in a direction opposite to the shaft rotation, much of the kinetic energy of the particles will be given up as unobjectionable frictional heat. Consequently, at the time $t_3$, the displacement amplitude of the damped system (point E' on curve A-E') will be greatly less than that of an undamped system (point E in curve A-E). A continuation of this process will cause the oscillations in the damped system to die out rapidly.

If the housing of the variable inertia device is held against rotation, a very small steady state error will result, although it will be much smaller than the steady state error involved where conventional viscous dampers are used. If the housing is permitted to rotate freely, there will be no steady state damping error.

In Fig. 2 a further application of the invention is shown in the form of a variable inertia arrangement for reducing small fluctuations or "jitter" in the driving action of the motor which may occur due to non-linearities in the mechanical drive system. In the case of a moving target which is close to the apparatus, this jitter does not significantly affect the accuracy of the target position data or the target velocity data. However, at long ranges, errors due to jitter often are too large to tolerate. On the other hand, it is important to have a low inertia system for short range operation so that the antenna can be kept trained on rapidly maneuvering targets, whereas at long ranges the angular velocity of the antenna will be small even with a rapidly maneuvering target, so that higher inertia can be tolerated in long range operation. Since operational jitter can be reduced significantly by making the effective drive motor inertia large with respect to the antenna inertia, it is evident that a system in which the effective drive motor inertia varies directly with range is very desirable. The remaining portion of the apparatus of Fig. 2 is provided to accomplish this result.

A variable inertia device $J_2$, similar to the device $J_1$, is mechanically coupled to the drive motor 42 to control the effective inertia of the motor 42 as a function of range. Magnetizing current proportional to range is obtained from the range unit 41 and is amplified in an amplifier 54, the arrangement being such that the magnetizing current will be large when the target is at long range, thereby increasing the effective drive motor inertia to decrease jitter, while the magnetizing current will decrease as the target range decreases in order that the system will not be sluggish during short range operation.

It is evident that the invention is not limited in applicability to servo systems, but is equally applicable to any apparatus wherein incrementally variable inertia can be used to advantage. Also, it is evident that the particular servo system shown is intended only to illustrate a typical use for the variable inertia devices, and since many changes could be made in the specific form of variable inertia device shown and described, as well as in the application thereof, the foregoing is to be construed as illustrative, and not in a limiting sense.

What we claim is:

1. A variable mass variable inertia device comprising a non-magnetic container, a single magnetizable member rotatably mounted in said container, a liquid in said container, magnetic particles in said container, a magnetic circuit consisting of said member, said liquid and variable quantities of said particles, and a magnetic field generator associated with said member to establish said circuit a particle-attracting magnetic field extending only through said member and said particles whereby to attract said particles to said member in an amount dependent on the effective intensity of said field and, hence, to vary the inertia of said member.

2. In a variable mass variable inertia device, a non-magnetic housing, a liquid in said housing, magnetic particles in said liquid, a single rotatably mounted magnetizable member extending into said liquid, and a coil wound on said member for generating in response to current through said coil a particle-attracting magnetic field originating and terminating in said member and extending only through said liquid and said member whereby to attract said particles to said member.

3. A variable mass variable inertia device comprising a non-magnetic housing, a liquid in said housing having finely divided magnetic particles therein, a shaft composed of magnetizable material rotatably mounted in said housing, a coil axially wound on said shaft within said housing for generating a particle-attracting magnetic field along a path extending longitudinally through said shaft into said liquid and returning only through said liquid to said shaft, and means to conduct magnetizing current to said coil.

4. A variable mass variable inertia device comprising a non-magnetic housing, a liquid in said housing having finely divided magnetic particles therein, a shaft composed of magnetizable material rotatably mounted in said housing and having a free end extending through one wall thereof for coupling said shaft to a rotary drive mechanism outside said housing, sealing means in said one wall and surrounding said shaft to prevent leakage of said liquid from said housing, a coil axially wound on said shaft within said housing for generating a particle-attracting magnetic field along a path extending longitudinally through said shaft into said liquid and returning only through said liquid to said shaft, slip-rings on said shaft outside of said housing, and connections between said slip-rings and said coil to conduct magnetizing current from said slip-rings to said coil.

5. Apparatus for varying the effective mass and, hence, the effective inertia of an element in a mechanical movement system, said apparatus comprising a non-magnetic housing, a magnetizable member mounted in said housing and mechanically coupled to rotate in response to movement of said element, magnetic particles in said housing, and variable intensity magnetic field generating means associated with said member to establish a variable intensity particle-attracting magnetic field extending only through said member and said particles whereby to vary the inertia of said member by attracting said particles to said member and, hence, to vary the inertia of said element.

6. Apparatus for varying the effective mass and hence, the effective inertia in a mechanical movement system, said apparatus comprising a non-magnetic container, a fluid in said container having finely divided magnetic particles dispersed therein, a magnetic member rotatably mounted in said container and mechanically coupled in said system to form an element thereof which is rotatable in response to mechanical movement in said system, a magnetic field generator associated with said member to establish through said member and said fluid a particle-attracting magnetic field along a path extending only through said fluid and said member within said container whereby to attract said particles to said member in amounts determined by the intensity of said field, and means connected to said generator to vary the intensity of said field.

HARRY SOHON.
LEONARD JACOBS.

REFERENCES CITED

The following references are of record in the file of this patent:

UNITED STATES PATENTS

| Number | Name | Date |
|---|---|---|
| 2,519,449 | Findley | Aug. 22, 1950 |
| 2,525,571 | Winther | Oct. 10, 1950 |

FOREIGN PATENTS

| Number | Country | Date |
|---|---|---|
| 485,591 | Belgium | Oct. 30, 1948 |

OTHER REFERENCES

The Magnetic Fluid Clutch, Jacob Rabinow, A. I. E. E. Transactions, vol. 67, 1948.

Magnetic Fluid Clutch in Servo Applications, Gorman Nelson Electronics, November 1949, pages 100–104.